June 18, 1957     J. R. CARTWRIGHT     2,796,598
ANALOGUE TO DIGITAL CONVERTERS
Filed Nov. 16, 1954
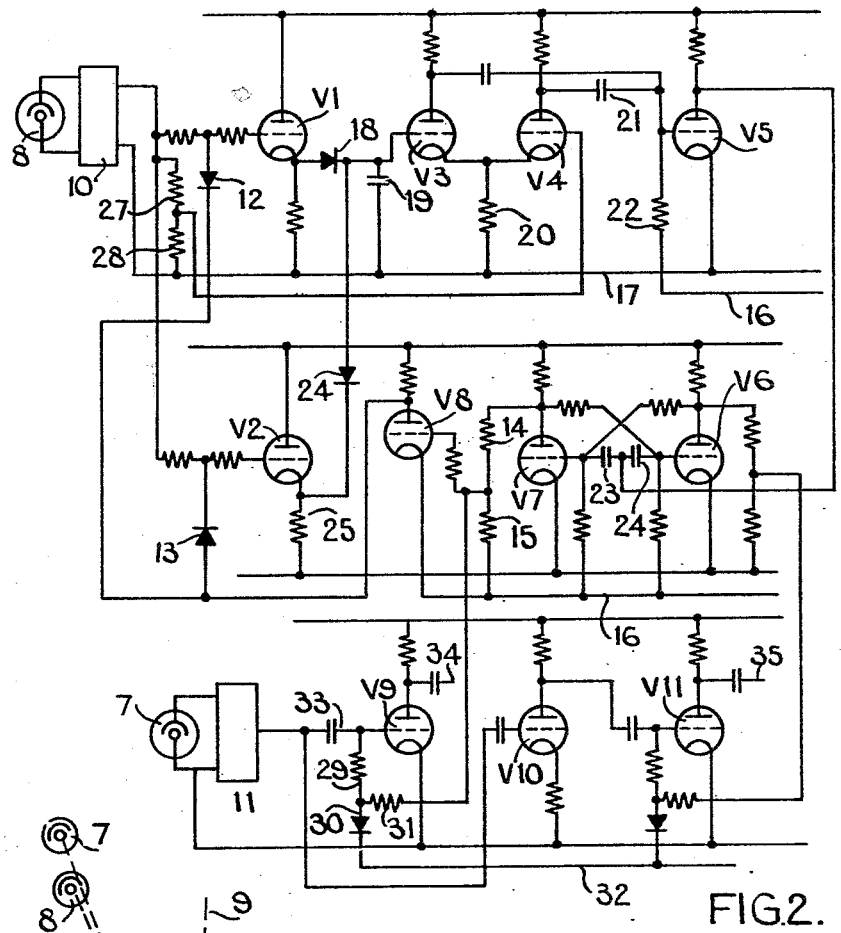
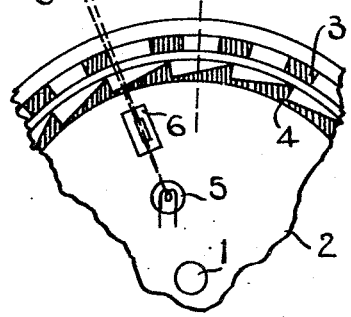
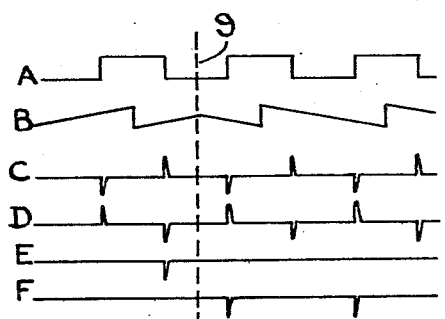
FIG.1.     FIG.3.
INVENTOR
JOHN ROBERT CARTWRIGHT
BY
ATTORNEY 2,796,598
Patented June 18, 1957

2,796,598
ANALOGUE TO DIGITAL CONVERTERS

John Robert Cartwright, Letchworth, England, assignor to The British Tabulating Machine Company Limited, London, England Application November 16, 1954, Serial No. 469,096

Claims priority, application Great Britain November 30, 1953

7 Claims. (Cl. 340—205)

This invention relates to apparatus for converting analogue data to digital data.

Various devices have already been proposed for converting analogue data, such as the angular displacement of a shaft from a datum position, into the digital equivalent. Usually the shaft is provided with means for generating a pulse for each unit of angular movement from the datum position, and these pulses may then be counted to provide the digital position indication. This is satisfactory if the shaft is continuously running during the counting period, or if it is brought to rest in a dead-beat manner.

There are, however, many cases in which an indicating shaft will tend to oscillate about an equilibrium position before finally coming to rest, as for example, the shaft carrying the indicating dial of a weighing machine. A straightforward pulse counting arrangement will be susceptible to errors in such a case, since pulses generated during the reverse movement of the shaft, when it is oscillating, will be added instead of subtracted.

The object of the invention is to provide apparatus for giving a digital indication of the position, relative to a datum position, of a member movable in either of two directions.

According to the invention apparatus for providing a digital indication of the position of a member movable in a first or a second direction, has means for generating a pair of pulses for each unit movement of the member, means for detecting the direction of movement of the member, and means, controlled by the detecting means, for selecting the first or second pulse of the pair, to provide an indication of the position of the member, in accordance with the movement of the member in the first or second direction.

The invention will now be described, by way of example, with reference to the accompanying drawing, in which:

Figure 1 is a schematic diagram showing part of an indicating dial;

Figure 2 is a diagram of the control circuits;

Figure 3 is a waveform diagram.

The angular movement of a shaft 1 (Figure 1), from a datum position, represents the quantity to be measured, for example, the weight of an object placed on the platform of a weighing machine. Attached to the shaft 1 is an indicating dial 2. The dial carries a scale 3 which indicates the angular movement of the dial 2, and hence of the shaft 1, and a scale 4 which indicates the direction in which the dial is rotating. The size of the scale markings has been exaggerated in relation to the dial for the sake of clarity.

The scale 3 consists of equal sections which are alternately transparent and opaque (shaded in Figure 1). The scale 4 consists of a series of opaque sections of sawtooth form, the start of each sawtooth being in line with the middle of an opaque section of the scale 3. The two scales intercept a light beam produced by a fixed lamp 5 and a slit 6, the light which passes through the scales 3 and 4 falling on photocells 7 and 8 respectively. It will be appreciated that Figure 1 is purely schematic and that the cells 7 and 8 are provided, in practice, with an optical system of the type normally used with a light scanning arrangement.

The photocell 7 drives a conventional amplifier 11 (Figure 2). This amplifier may be D. C. coupled, or A. C. coupled with the circuit constants providing a level response down to, say, ten cycles per second. This is necessary since the dial 2 may be moving comparatively slowly during the period when the direction of rotation is reversing. This variation of speed has been ignored in drawing the waveforms of Figure 3. It has been assumed that the dial moves with constant velocity in either direction and reverses substantially instantaneously. This assumption does not affect the method of operation of the circuit, but it makes the waveform diagram much clearer. The output from the amplifier 11 is shown at line A of Figure 3, the positive half cycles of the square wave corresponding to the passage of an opaque section of the scale 3 past the photocell 7.

The photocell 8 drives an amplifier 10, which is similar to the amplifier 11. The output waveform of the amplifier 10, when the dial 2 rotates from the position shown to bring the part indicated by dotted line 9 opposite the slit in the plate 6 and then reverses the direction of rotation, is approximately that of line B of Figure 3. The output waveform decreases linearly on the right hand side of the line 9, without the small horizontal step. This type of sawtooth waveform may also be produced by making each section of the scale 4 vary in density along the length linearly from transparent to opaque.

The output voltage of the amplifier 10 is fed in common to the grids of two cathode followers V1 and V2. The grids of the cathode followers are connected through clamping diodes 12 and 13 to the anode of a D. C. amplifier V8. The cathode of V8 is connected to a negative supply line 16, and the grid voltage is controlled by a potentiometer comprising resistors 14 and 15, which are connected between the anode of a valve V7 and the line 16.

The anode and grid of V7 are cross-coupled to the grid and anode of a valve V6, so that the two valves form a conventional bi-stable trigger circuit. It will be assumed that the initial movement of the dial 2 is representative of an additive movement from the datum position. For reasons which will be apparent later, the trigger will be in the stable state in which V7 is conducting and V6 is cut-off. Thus the grid of V8 will be at a low voltage and the anode will be considerably positive to ground line 17.

The diode 13 will conduct and hold the grid of V2 at approximately the same voltage as the anode of V8, whereas the diode 12 will be non-conducting, until the voltage of the grid of V1 rises above the voltage of the anode of V8. The amplitude of the output waveform of the amplifier 10 is such that the grid of V1 swings from near ground potential to a little less than the conduction point of the diode 12. Consequently, the cathode of V1 will follow the first linear rise of the waveform shown at line B.

The cathode of V1 is connected through a diode 18 to the grid of a valve V3 and a capacitor 19. The diode 18 allows the capacitor 19 to charge as long as the input voltage continues to rise. The grid of a valve V4 is also driven by the amplifier 10, through a potentiometer comprising resistors 27 and 28. The ratio of these resistors is such that the voltage fed to the grid of V4 is equal to the voltage developed at the cathode of V1. The valves V3 and V4 have a common cathode load resistor 20, and the grids are at substantially the same voltage, so that both valves are conducting.

When the output voltage from the amplifier 10 drops sharply at the end of the sawtooth, the diode 18 prevents the capacitor 19 from discharging, so that the grid of V3, and the cathode, are held at approximately the peak voltage of the sawtooth. The grid of V4 rapidly falls below the cathode potential and the valve cuts off, producing a positive pulse at the anode. This pulse is fed to the grid of a normally cut off valve V5, by a capacitor 21 and a resistor 22 which form a differentiating network.

The valve V5 develops a negative pulse at the anode, which is fed to the grids of the trigger through capacitors 23 and 24. This pulse switches over the trigger to the other stable state with V6 conducting and V7 cut off.

The switching of the trigger raises the grid voltage of V8, with the result that the anode voltage falls to near the potential of the ground line 17. Previous to this the cathode of V2 was held at a high positive voltage, which prevented the capacitor discharging through a diode 24 and cathode resistor 25. The reduction of the anode voltage of V8 brings down the voltage of the grid of V2, the cathode of V2 falls until the diode 24 conducts, and the capacitor 19 then discharges rapidly through the resistance 25. The time taken for the valve V4 cutting off, the switching of the trigger and the discharge of the capacitor 19 is small compared with the duration of the linear rise, so that the voltage across the capacitor, represented by line B of Figure 3 is substantially a replica of the linear rise and rapid fall of the marks of the scale 4.

The output voltage from the amplifier 10 now starts a linear rise as the photocell 8 scans the next mark on the scale 4. The cathode of V2 rises, but the diode 24 is non-conducting since the capacitor 19 has been discharged. The grid of V1 is held stationary by the clamping action of the diode 12. The grid of V4, however, follows the rise and rapidly raises the commoned cathode sufficiently to cut off the valve V3. This valve produces a positive pulse at the anode, which is fed to V5, which produces a negative pulse to switch the trigger V6 and V7 back to the first stable state. This again changes the anode voltage of V8, allowing the cathode follower V1 to start charging the capacitor 19, and the circuit is now in the condition originally described. Whilst the dial 2 is moving in the adding direction, this cycle of events will occur for each mark of the scale 4 which is scanned.

If the dial stops with the part of the dial indicated at 9 being scanned, the capacitor 19 will be only partially charged as shown at line B. As the scale reverses the direction of rotation, the output voltage of the amplifier 10 will start to fall linearly. The diode 18 will hold the capacitor charged, but the grid voltage of V4 will fall and V4 will be cut off in the same way as at the end of a sawtooth. The resulting pulse will switch the triggers V6 and V7 to the second stable state. This allows the grid of V2 to follow the input waveform and the capacitor 19 is free to folow the linearly falling voltage. The time taken for V4 to cut off and the trigger to switch over results in a small horizontal step in the capacitor voltage waveform, as shown at line B. As soon as the cathode follower V2 becomes operative, V4 will again conduct.

At the end of the sawtooth, the voltage rises rapidly. The cathode of V2 also rises, rendering the diode 24 non-conducting. The commoned cathodes of V3 and V4 rise due to the rising grid voltage of V4. This causes V3 to cut off and produce a pulse to switch the trigger to the first stable state. The capacitor 19 is now charged to the peak voltage of the sawtooth and, when the linear voltage fall begins, V4 will cut off and cause the trigger to be switched to the second stable state. Thus, ignoring for the moment the points at which the trigger is actually switched, the trigger is in the first stable state when the shaft 1 and dial 2 are rotating in an additive direction and is in the second stable state when they are rotating in the subtractive direction.

The potentiometer which controls V8 also controls the grid voltage of a valve V9. The grid of V9 is connected through a resistor 29 and a diode 30 to a negative line 32. The junction of the resistor 29 and the diode 30 is connected through a resistor 31 to the potentiometers 14 and 15, so that when V7 conducts, the grid of V9 is driven well below cut off, whereas when V7 is cut off, the grid of V9 is held at the voltage of the line 32 by conduction through the diode 30 and this places the grid just below cut off.

The grid of V9 is connected to the output of the amplifier 11 through a capacitor 33, which forms a differentiating circuit with the resistor 29. Thus the grid receives alternate positive and negative pulses as at line D, corresponding to the leading and trailing edges of the square wave of line A. If V7 is cut off, the grid potential of V9 is sufficiently near cut off to allow the positive pulses of the differentiated waveform to drive the valve into conduction. If V7 is conducting, the grid of V9 is held sufficiently far below cut off to prevent the positive pulses from causing conduction.

The output from the amplifier 11 is also fed to an inverter valve V10, the output from which is connected through a differentiating circuit to the grid of a valve V11. This valve is controlled by V6 in the same way as V9 is controlled by V7. Consequently, V11 will produce negative output pulses only when V6 is non-conducting.

The waveform fed to the grid of V11 will consist of negative and positive pulses alternately, as at line C, and is the inverse of the waveform applied to the grid of V9. Thus, if V9 is operative it will produce negative pulses corresponding to the falling edges of the waveform of line A and if V11 is operative it will produce negative pulses corresponding to the rising edges of the waveform of line A.

In this way, a pulse is produced for each mark of the scale 3 which passes the photocell 7, the pulses appearing on line 35, from the anode of V11, when the dial is moving in the additive direction, and on line 34, from the anode of V9, when the dial is moving in the subtractive direction. It will be apparent that the convention which has been used is that a unit increment is added each time the photocell 7 senses a change from an opaque section to a transparent section. A unit is subtracted each time there is a change from a transparent section to an opaque section. This change of convention for additive and subtractive directions is necessary to avoid the possibility of error. For example, suppose that the dial reverses whilst the light beam is in the middle of an opaque section, then a unit will not be added for that mark. However, if the same convention is used for both directions, a unit will be subtracted as the light beam senses the passage from the mark to the adjoining transparent section in the subtractive direction, and the count will therefore be in error by one unit.

The pulses from the valves V9 and V11 may be counted by and adding/subtracting polycathode gas tube counter of the type described in co-pending British patent application No. 33,174/53. Alternatively, each valve may operate a separate counter, the value registered in one counter being subtracted from that registered by the other, to provide a net value, whenever it is required to read the position of the dial.

Although the relation between the scales 3 and 4, as described, is such that the beginning of each sawtooth coincides with the middle of an opaque section of the scale 3, this is not necessary. If desired, the relation between the scales may be different, but it will be appreciated that the beginning of each sawtooth should not coincide with either edge of an opaque section of the scale 3, since the switching of the trigger V6 and V7 at this point might interfere with the correct transmission of the pulses to be counted.

What we claim is:

1. Apparatus for providing a digital indication of the position of a member movable in a first or a second direction, comprising means for generating a pair of pulses for each unit movement of the member, means for detecting the direction of movement of the member, a device settable to either of two states, means controlled by said detecting means for setting said device to one of said states when said member moves into said first direction and the other of said states when said member moves into said second direction, and means, controlled by the said settable device, for selecting the first or second pulse of the pair, to provide an indication of the position of the member, in accordance with movement of the member in the first or second direction.

2. In apparatus for digitally indicating the position of a member capable of reversible movement, by counting pulses emitted during such movement, the combination comprising means for generating two trains of pulses, each containing one pulse for each unit movement of said member, means, independent of said generating means, for detecting the direction of movement of said member, a device settable to either of two states, means controlled by said detecting means for setting said device to one state when said movement is in one direction and to the other state when said movement is in the opposite direction and means controlled by said settable device and operatively connected to said generating means for selecting one of said pulse trains in accordance with the setting of said device.

3. In positional indicating apparatus in which pulses emitted during change of position are counted, the combination comprising a reversible movable member, the position of which is to be indicated, first generating means for generating a pulse for each unit movement of said member, second generating means for generating during movement of said member, further pulses which have a first or a second waveform according to the direction of movement of said said member, a device settable to either of two stable states, means operatively connected to said second generating means and indepndent of said first generating means for setting said device to one of said states when said further pulses have said first waveform and to the other of said states when said further pulses have said second waveform, two gates each operatively connected to said first generating means, and means controlled by said settable device for operating one said gate when said device is in one said state and for operating the other said gate when said device is in the other said state.

4. Positional indicating apparatus comprising a reversible movable member, a first pulse generator for generating a pulse in each of two pulse trains for each unit movement of said member, a second pulse generator for generating a substantially saw tooth waveform for each said unit movement, said waveform being reversed on reverse movement of said member, a bi-stable trigger circuit, means sensitive to the waveforms generated by said second generator for setting said trigger circuit to a first stable state and to a second stable state according to the direction of movement of said member, a first gate and a second gate, means for applying said pulse trains individually to said gates, and means controlled by said trigger circuit, for operating said first gate when said circuit is in said first stable state and for operating said second gate when said circuit is in said second stable state.

5. Positional indicating apparatus comprising a reversible movable member, a first generator for generating a pulse in each of two pulse trains for each unit movement of said member, a second generator for generating a substantially saw tooth wave form for each said unit movement, said waveform being reversed on reverse movement of said member, a capacitor, means for charging said capacitor under control of said waveform, means for discharging said capacitor, a bi-stable trigger circuit, means under the joint control of the voltage developed across said capacitor and said sawtooth waveform for producing an operating pulse each time there is a predetermined difference between the controlling voltages, means for applying said operating pulse to said trigger circuit to change said circuit from one to the other of its stable states, means for rendering operative said charging means when said trigger circuit is in one said stable state, means for rendering operative said discharging means when said trigger circuit is in the other of said stable states, two gating means, means for applying said pulse trains individually to said gates, and means controlled by said trigger circuit for operating said first gate to pass a pulse of one said train when said circuit is in one said stable state and for operating said second gate to pass a pulse of the other said train when said circuit is in the other said stable state.

6. Apparatus as claimed in claim 5, in which said means for producing an operating pulse comprises a pair of thermionic valves, having a common cathode load resistor, the capacitor voltage being applied to a control electrode of one of said pair of valves, and the sawtooth waveform being applied to a control electrode of the other of said pair of valves.

7. Apparatus as claimed in claim 6, in which said charging and discharging means each comprise a thermionic valve, connected as a cathode follower, the voltage developed across a cathode load resistor of each cathode follower being applied to the capacitor through a diode.

References Cited in the file of this patent

UNITED STATES PATENTS

| 2,656,106 | Stabler | Oct. 20, 1953 |
| 2,685,082 | Beman et al. | July 27, 1954 |